US009603419B2

(12) United States Patent
Crosby et al.

(10) Patent No.: US 9,603,419 B2
(45) Date of Patent: Mar. 28, 2017

(54) HIGH CAPACITY EASY RELEASE EXTENDED USE ADHESIVE CLOSURE DEVICES

(71) Applicant: University of Massachusetts, Boston, MA (US)

(72) Inventors: Alfred J. Crosby, Amherst, MA (US); Michael D. Bartlett, Amherst, MA (US); Duncan J. Irschick, Amherst, MA (US); Daniel R. King, Sunderland, MA (US)

(73) Assignee: University of Massachusetts, Boston, MA (US)

( * ) Notice: Subject to any disclaimer, the term of this patent is extended or adjusted under 35 U.S.C. 154(b) by 32 days.

(21) Appl. No.: 14/213,159

(22) Filed: Mar. 14, 2014

(65) Prior Publication Data

US 2014/0304953 A1  Oct. 16, 2014

Related U.S. Application Data

(60) Provisional application No. 61/787,320, filed on Mar. 15, 2013.

(51) Int. Cl.
*A44B 18/00* (2006.01)
*B32B 7/00* (2006.01)
*C09J 7/02* (2006.01)
*C09J 7/04* (2006.01)

(52) U.S. Cl.
CPC ............ *A44B 18/0069* (2013.01); *B32B 7/00* (2013.01); *C09J 7/02* (2013.01); *C09J 7/048* (2013.01); *C09J 2400/00* (2013.01); *C09J 2433/00* (2013.01); *C09J 2475/00* (2013.01); *C09J 2483/00* (2013.01); *Y10T 24/33* (2015.01); *Y10T 428/24612* (2015.01); *Y10T 428/2848* (2015.01)

(58) Field of Classification Search
None
See application file for complete search history.

(56) References Cited

U.S. PATENT DOCUMENTS 1,739,296 A   12/1929  Du Pont
3,653,381 A *  4/1972  Warnken ................. A61F 13/62
                                                  604/391

(Continued)

FOREIGN PATENT DOCUMENTS

CN    1284983 A    2/2001
CN    1508204 A    6/2004

(Continued)

OTHER PUBLICATIONS

Creton, C. "Pressure-Sensitive Adhesives: An Introductory Course". MRS Bulletin (Jun. 2003), p. 434-439. <www.mrs.org/publications/bulletin>.*

(Continued)

*Primary Examiner* — David Sample
*Assistant Examiner* — Donald M Flores, Jr.
(74) *Attorney, Agent, or Firm* — Wolf, Greenfield & Sacks, P.C.

(57) ABSTRACT

Unique designs, devices, systems, materials and fabrication methods are provided including adhesive closure devices that are easily released and are suitable for extended/repeated use in a variety of applications.

17 Claims, 12 Drawing Sheets

(56) References Cited

U.S. PATENT DOCUMENTS

| | | | |
|---|---|---|---|
| 3,691,140 A * | 9/1972 | Silver | C08F 220/18 |
| | | | 524/813 |
| 4,357,198 A | 11/1982 | Ezquerro | |
| 4,851,076 A | 7/1989 | Manusch et al. | |
| 4,915,768 A | 4/1990 | Soderberg | |
| 4,926,526 A | 5/1990 | Brown et al. | |
| 4,967,740 A | 11/1990 | Riedel | |
| 5,049,416 A | 9/1991 | Wilczynski | |
| 5,269,871 A | 12/1993 | Longworth et al. | |
| 5,399,219 A * | 3/1995 | Roessler | A61F 13/15756 |
| | | | 156/229 |
| 5,516,581 A | 5/1996 | Kreckel et al. | |
| 5,722,127 A * | 3/1998 | Coates | A61F 13/49003 |
| | | | 24/304 |
| 5,747,131 A | 5/1998 | Kreckel | |
| 5,865,945 A | 2/1999 | McConaughy | |
| 6,045,642 A | 4/2000 | Takeuchi et al. | |
| 6,120,867 A | 9/2000 | Hamerski et al. | |
| 6,302,177 B1 | 10/2001 | Gruber | |
| 6,403,206 B1 * | 6/2002 | Bries | A47G 1/175 |
| | | | 428/220 |
| 6,558,789 B1 * | 5/2003 | Hamerski | C09J 7/02 |
| | | | 428/192 |
| 6,569,521 B1 | 5/2003 | Sheridan et al. | |
| 6,572,945 B2 * | 6/2003 | Bries | C09J 7/02 |
| | | | 428/99 |
| 6,701,580 B1 * | 3/2004 | Bandyopadhyay | B65D 63/10 |
| | | | 24/16 R |
| 6,737,160 B1 | 5/2004 | Full et al. | |
| 6,872,439 B2 | 3/2005 | Fearing et al. | |
| 6,913,075 B1 | 7/2005 | Knowles et al. | |
| 7,011,723 B2 | 3/2006 | Full et al. | |
| 7,056,409 B2 | 6/2006 | Dubrow | |
| 7,066,182 B1 | 6/2006 | Dunshee | |
| 7,132,161 B2 | 11/2006 | Knowles et al. | |
| 7,144,624 B2 | 12/2006 | Knowles et al. | |
| 7,175,723 B2 | 2/2007 | Jones et al. | |
| 7,181,811 B1 | 2/2007 | Tomanek et al. | |
| 7,229,685 B2 | 6/2007 | Full et al. | |
| 7,762,362 B2 | 7/2010 | Cutkosky et al. | |
| 7,780,810 B2 | 8/2010 | Hamano | |
| 8,108,974 B2 | 2/2012 | Graf | |
| 8,557,378 B2 | 10/2013 | Yamanaka et al. | |
| 9,182,075 B2 | 11/2015 | Crosby et al. | |
| 2002/0095130 A1 * | 7/2002 | Seitter | A61F 13/5622 |
| | | | 604/389 |
| 2003/0038408 A1 | 2/2003 | Schulte | |
| 2003/0124312 A1 | 7/2003 | Autumn | |
| 2003/0134112 A1 | 7/2003 | Kreckel et al. | |
| 2003/0232190 A1 * | 12/2003 | O—Leary | B32B 7/02 |
| | | | 428/343 |
| 2004/0009353 A1 | 1/2004 | Knowles et al. | |
| 2004/0046094 A1 | 3/2004 | Lan | |
| 2004/0076822 A1 | 4/2004 | Jagota et al. | |
| 2005/0119640 A1 | 6/2005 | Sverduk et al. | |
| 2005/0148984 A1 * | 7/2005 | Lindsay | A61F 13/5611 |
| | | | 604/387 |
| 2005/0181170 A1 | 8/2005 | Fearing et al. | |
| 2006/0078725 A1 | 4/2006 | Fearing et al. | |
| 2006/0202355 A1 | 9/2006 | Majidi et al. | |
| 2007/0232974 A1 * | 10/2007 | Serola | A61F 5/0193 |
| | | | 602/19 |
| 2007/0289786 A1 | 12/2007 | Cutkosky et al. | |
| 2008/0025822 A1 | 1/2008 | Kim et al. | |
| 2008/0164080 A1 | 7/2008 | Asbeck et al. | |
| 2009/0106951 A1 | 4/2009 | Edwards et al. | |
| 2010/0038502 A1 | 2/2010 | Lan | |
| 2010/0044491 A1 | 2/2010 | Ritchey et al. | |
| 2010/0136281 A1 * | 6/2010 | Sitti | A44B 18/0049 |
| | | | 428/92 |
| 2010/0175836 A1 | 7/2010 | Lam | |
| 2010/0221496 A1 | 9/2010 | de Jong | |
| 2012/0204383 A1 * | 8/2012 | Wood | A44B 18/0046 |
| | | | 24/306 |
| 2012/0216949 A1 | 8/2012 | Stachowski et al. | |
| 2013/0273333 A1 | 10/2013 | Thorsten et al. | |
| 2014/0030490 A1 | 1/2014 | Crosby et al. | |
| 2014/0305569 A1 | 10/2014 | Crosby et al. | |
| 2014/0312188 A1 | 10/2014 | Crosby et al. | |
| 2014/0352881 A1 | 12/2014 | Crosby et al. | |

FOREIGN PATENT DOCUMENTS

| | | |
|---|---|---|
| CN | 1985288 A | 6/2007 |
| CN | 101528169 A | 9/2009 |
| CN | 2013-56127 Y | 12/2009 |
| DE | 4339604 A1 | 5/1995 |
| DE | 20-2010-014239 U1 | 12/2010 |
| EP | 1710287 A2 | 10/2006 |
| EP | 2522498 A1 | 11/2012 |
| JP | 55-52721 A | 4/1980 |
| JP | 2001-104118 A | 4/2001 |
| JP | 2002-501107 A | 1/2002 |
| JP | 2005-298641 A | 10/2005 |
| RU | 2381969 C2 | 2/2010 |
| RU | 111405 U1 | 12/2011 |
| WO | WO 99/55791 A1 | 11/1999 |
| WO | WO 2008/019994 A2 | 2/2008 |
| WO | WO 2008/028120 A1 | 3/2008 |
| WO | WO 2011/019511 A2 | 2/2011 |
| WO | WO 2012/078249 A2 | 6/2012 |

OTHER PUBLICATIONS

Extended European Search Report mailed Aug. 11, 2015 in connection with Application No. 13738720.5.

International Preliminary Report on Patentability mailed Sep. 24, 2015 in connection with Application No. PCT/US2014/027392.

International Preliminary Report on Patentability mailed Aug. 20, 2015 in connection with Application No. PCT/US2014/014755.

International Preliminary Report on Patentability mailed Sep. 24, 2015 in connection with Application No. PCT/US2014/028422.

No Author Listed, Database WPI Week 201002. Thomson Scientific, London, GB. 2009:XP002742926:1 page.

International Search Report and Written Opinion dated Jul. 31, 2012 in connection with Application No. PCT/US2011/057309.

International Preliminary Report on Patentability dated May 2, 2013 in connection with Application No. PCT/US2011/057309.

International Search Report and Written Opinion dated Apr. 25, 2013 in connection with Application No. PCT/US2013/021846.

International Preliminary Report on Patentability dated Jul. 31, 2014 in connection with Application No. PCT/US2013/021846.

International Search Report dated Aug. 28, 2014 in connection with Application No. PCT/US2014/027392.

International Search Report dated May 22, 2014 in connection with Application No. PCT/US2014/014755.

International Search Report and Written Opinion dated Aug. 28, 2014 in connection with Application No. PCT/US2014/028422.

Bartlett et al., Draping polymer adhesives. Polymer Science and Engineering, University of Massachusetts Amherst Gecko Workshop. Jul. 2010: 1 page.

Bartlett et al., Looking beyond fibrillar features to scale gecko-like adhesion. Adv Mater. 2012;24:1078-1083.

Boesel et al., Gecko-inspired surfaces: a path to strong and reversible dry adhesives. Adv Mater. May 18, 2010;22(19):2125-37. doi: 10.1002/adma.200903200.

Chan et al., Designing model systems for enhanced adhesion. MRS Bulletin. Jun. 2007;32(6):496-503.

Creton et al., Materials science of adhesives: how to bond things together. MRS Bulletin. Jun. 2003;28(6):419-423.

Creton, Pressure-sensitive adhesives: an introductory course. MRS Bulletin. Jun. 2003;28(6):434-439.

Creton et al., Sticky feet: from animals to materials. MRS Bulletin. Jun. 2007;32(6):466-472.

Crosby et al., Adhesive failure analysis of pressure-sensitive adhesives. J Poly Sci Part B: Poly Phys. Dec. 1999;37(24):3455-3472.

* cited by examiner $$F_C = \sqrt{G_C}\sqrt{\frac{A}{C}}$$

$$C_{post} = \frac{4}{3\mu}\frac{t^3}{bh^3}$$

Add elements by the rules of compliance addition $$F_c = \sqrt{G_c}\sqrt{\frac{(b_1h_1+b_2h_2+b_3h_3+\cdots)}{C_1C_2C_3\cdots/(C_1C_2\cdots+C_2C_3\cdots+C_1C_3+\cdots)}}$$

$$= N\sqrt{G_c}\sqrt{\frac{bh}{C}}$$

HIGH CAPACITY EASY RELEASE EXTENDED USE ADHESIVE CLOSURE DEVICES

PRIORITY CLAIMS AND RELATED APPLICATIONS

This application claims the benefit of U.S. Provisional Application No. 61/787,320, filed Mar. 15, 2013, the entire content of which is incorporated herein by reference in its entirety.

TECHNICAL FIELD

The present disclosure generally relates to closure systems and devices. More particularly, the present disclosure relates to systems, devices, materials and fabrication methods that provide adhesive closure devices that are easily closed/released and suitable for extended/repeated use in a variety of applications.

BACKGROUND

The design of closures that function over a range of force capacities, and which offer an easy, silent and smooth release, is desirable for many reasons. Hook and loop fasteners are widely used as closures with other designs, such as metal or plastic snap buttons, buttons used with openings, zippers and straps that attach to one another via interlocking, also being widely used.

Hook and loop fasteners (e.g., Velcro™) are widely used in many closure applications such as apparel, houseware, shoes, and toys, among others. Hook and loop fasteners typically have two components: Two lineal fabric strips that are attached to the opposing surfaces to be fastened. The first component features tiny hooks; and the second features even smaller loops. When the two components are pressed together, the hooks catch in the loops and the two pieces fasten or bind temporarily. Separation is caused by pulling or peeling the two surfaces apart, accompanied by a distinctive "ripping" sound.

Zipper-based devices are also commonly seen closure systems. A zipper-based closure system was described in US Patent Pub. No. 20090106951A1, which can be employed on apparel.

While all of the above options are effective as closures for some applications, they all suffer significant disadvantages. For example, hook and loop fasteners are known for being strong, but they are also noisy during peeling. They also present some aesthetic downfalls, including their bulky design, abrasiveness and their tendency to attach accidentally to other surfaces, such as clothes. Other means of closure, such as buttons and zippers, also present limitations, as they are often bulky, noisy and prone to failure.

SUMMARY

Various embodiments provide unique releasable closure devices that can be easily closed and released, and which are also silent and suitable for extended and repeated use. Various adhesive closure systems and devices, as well as related methods, disclosed herein can be designed to fit a number of applications ranging from fasteners, reinforcements, taping, apparel, housewares, to shoes and toys, for example. The closure devices in accordance with aspects described herein are comparable, and, in some cases, superior to, hook and loop fasteners, but with a substantially smoother and more silent release, and with a much thinner profile.

In one aspect, various embodiments generally relate to a releasable, surface-adhesive closure device. The device includes two adhesive pads, each pad comprising a backing layer having high in-plane stiffness; and an adhesive layer of an elastic material having an adhering surface on at least one side of the elastic material, wherein the elastic material is applied onto the backing layer on at least the side opposing the adhering surface. The two adhesive pads form a releasable seal when pressed against each other with the two adhering surfaces positioned face to face.

In another aspect, various embodiments generally relate to a releasable, surface-adhesive closure device. The device includes: an adhesive pad and an adherent member. The adhesive pad includes a backing layer having high in-plane stiffness; and an adhesive layer of an elastic material having an adhering surface on at least one side of the elastic material, wherein the elastic material is applied onto the backing layer on at least the side opposing the adhering surface. The adherent member having a surface for adherence by the adhesive pad. The adhesive pad and the adherent member form a releasable seal when pressed against each other with the adhering surface and the adherent surface positioned face to face.

In yet another aspect, various embodiments generally relate to a releasable, surface-adhesive closure device. The device includes: two adhesive pads and a tether component. Each of the two adhesive pads includes a backing layer having high in-plane stiffness and an adhesive layer of an elastic material having an adhering surface on at least one side of the elastic material. The elastic material is applied onto the backing layer on at least the side opposing the adhering surface. The tether component attached to the two adhesive pads such that the two adhering surfaces face are disposed on the same side and together form a releasable connection or closure once the two adhesive pads adhesively attach to a third-object adherent surface.

In yet another aspect, various embodiments generally relate to a releasable, surface-adhesive closure device. The device includes: a first adhesive-adherent set comprising an adhesive pad and a first adherent surface; a second adhesive-adherent set comprising a second adhesive pad and a second adherent surface; and a tether component attached to the two adhesive-adherent set such that, when looped around, the first adhesive pad is adapted to adhesively attach to the second adherent surface and the second adhesive pad is adapted to adhesively attach to the first adherent surface, thereby forming a releasable connection or closure. Each adhesive pad includes a backing layer having high in-plane stiffness and a adhesive layer of an elastic material having an adhering surface on at least one side of the elastic material. The elastic material is applied onto the backing layer on at least the side opposing the adhering surface.

In yet another aspect, various embodiments generally relate to a releasable, surface-adhesive closure device. The device includes: a first adhesive pad, a second adhesive pad, and an insert component. The first adhesive pad includes: a first backing layer having high in-plane stiffness, and a first adhesive layer of an elastic material having an adhering surface on at least one side of the elastic material, wherein the elastic material is applied onto the first backing layer on at least the side opposing the adhering surface. The second adhesive pad includes: a second backing layer having high in-plane stiffness, and a second adhesive layer of an elastic material having an adhering surface on at least one side of the elastic material, wherein the elastic material is applied onto the backing layer on at least the side opposing the adhering surface. The insert component includes a first surface and a second surface. The insert component is disposed between the first adhesive pad and the second adhesive pad such that the first surface of the insert component and the first adhesive layer of the first adhesive pad, when pressed together, form a first releasable seal, and the second surface of the insert component and the second adhesive layer of the second adhesive pad, when pressed together, form a second releasable seal.

DETAILED DESCRIPTION

The present disclosure provides unique releasable closure systems and devices that are easily closed and released, silent, and suitable for extended and repeated use. The closure devices are strong, yet are easily, smoothly and silently released over multiple loading cycles, thereby offering significant advantages over existing closure systems.

A technological breakthrough, Geckskin™ is a gecko-inspired, fabric-backed adhesive system that relies on the integration of three parts (a "pad", "skin", and a "tendon"), which collectively provide for stiffness in the direction of loading, thus enabling high adhesive force capacity, yet with an easy and repeatable release.

Gecko-inspired closure systems offer significant advantages over existing closure technologies. Whereas closures such as Velcro™, zippers or buttons are noisy and often challenging to engage and disengage, closures made using gecko-like adhering materials are significantly more silent, smooth and easily operated. In addition, while existing closure devices tend to be bulky, closures made from gecko-like adhering materials can be thin and light-weight, thereby taking up less space and weight on apparel. Furthermore, gecko-inspired systems can be designed to have exceptional mechanical strength, potentially stronger than hoop and look fasteners, and with a greater degree of reusability.

Designs and systems allow separation time and energy to be minimized, while maintaining the ability to support high holding or tightening forces. The designs, systems and methods disclosed herein do not require the use of surface fibrillar structures to achieve desired attributes. Though, for some embodiments, the device may employ various configurations of surface fibrillar structures.

Figure 1:
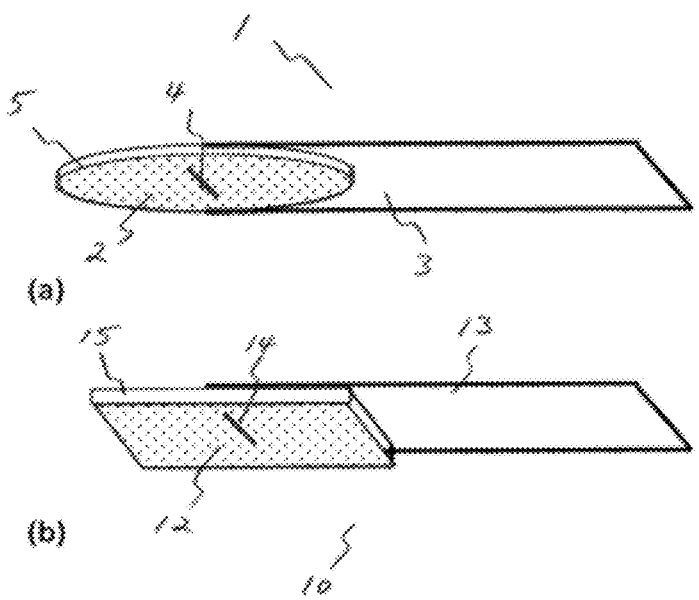
FIG. 1 shows a schematic illustration of an exemplary embodiment of an adhesive pad.

As a component of systems, the adhesive pad utilized herein adopts a "dry" adhesive pad structure, sometimes referred to as a "T-pad", an embodiment of which is schematically illustrated in FIG. 1. Properly designed, the T-pad device can support high loads under shear, normal, and multi-mode (i.e. peel) loadings while requiring relatively low forces and energy for release (or separation) under specifically-designed release strategies. In a basic structure of the adhesive component, a "pad" is connected to a tether (e.g., a synthetic fabric tether), which may be referred to herein as the "tendon". The tether may be arranged so as to maintain a generally high stiffness along the primary axis of loading. The connection between the tendon and the pad has pre-defined dimensions, orientation, and spatial location, according to particular needs, that can be modified to control the release strategy and provide a suitable balance of shear and normal loading. Two exemplary embodiments of adhesive pad devices are schematically illustrated in FIG. 1, wherein (a) depicts an adhesive pad 1 having an adhering surface 2 having a circular outer boundary 5. The adhesive pad is attached or otherwise coupled to a tether component 3 at line 4. Similarly, (b) depicts an adhesive pad 10 having an adhering surface 12 having a rectangular outer boundary 15. The adhesive pad is coupled (e.g., connected, attached) to a tether component 13 at line 14. It should be appreciated that other types and shapes of adhering surfaces may be employed, and are not limited to those specifically described herein. For example, the adhering surface may have any suitable shape, such as circular, rectangular, polygonal, irregular, oblong, etc.

Figure 2:
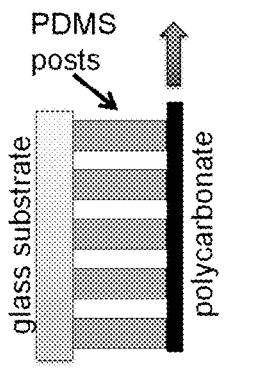
FIG. 2 shows certain design factors and schematic illustrations in accordance with some embodiments.
Figure 2:
Figure 2:
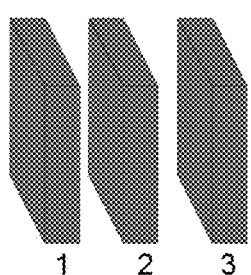

Such an adhesive pad design represents a unique combination of adhesion attributes of polymer materials and integrated mechanical designs through proper conservation of rotational freedom, low flexural modulus normal to the adhesive interface, and high stiffness in load bearing directions. A scaling relationship has been developed by the inventors to provide a framework for understanding the adhesive performance of the materials devices over a range of size scales and geometries (FIG. 2). This scaling relationship suggests that the adhesive capacity ($F_C$) of an interface is governed by three simple parameters, which are dependent on both the geometry and material properties of the interface. To design reversible adhesives which can adhere to various substrates, the interfacial interactions ($G_C$) should rely upon non-specific van der Waals forces, rendering $G_C$ an ineffective control parameter. Therefore, to scale $F_C$ for adhesive materials the material system must not just rely on area on contact (A) or the system compliance (C) but must develop attributes that increase the A/C ratio. This presents a challenge; materials should generally be soft to increase true contact, yet stiff to be able to withstand high loads. Soft materials are able to create large-scale contact but are compliant when subject to relatively high loads, while stiff materials are less likely to be able to create extensive contact with a substrate; though, both cases result in a null effect on the A/C ratio. Embodiments disclosed herein provide a mechanism for maximizing A/C, and most importantly, tuning this governing parameter for different applications.

Figure 3:
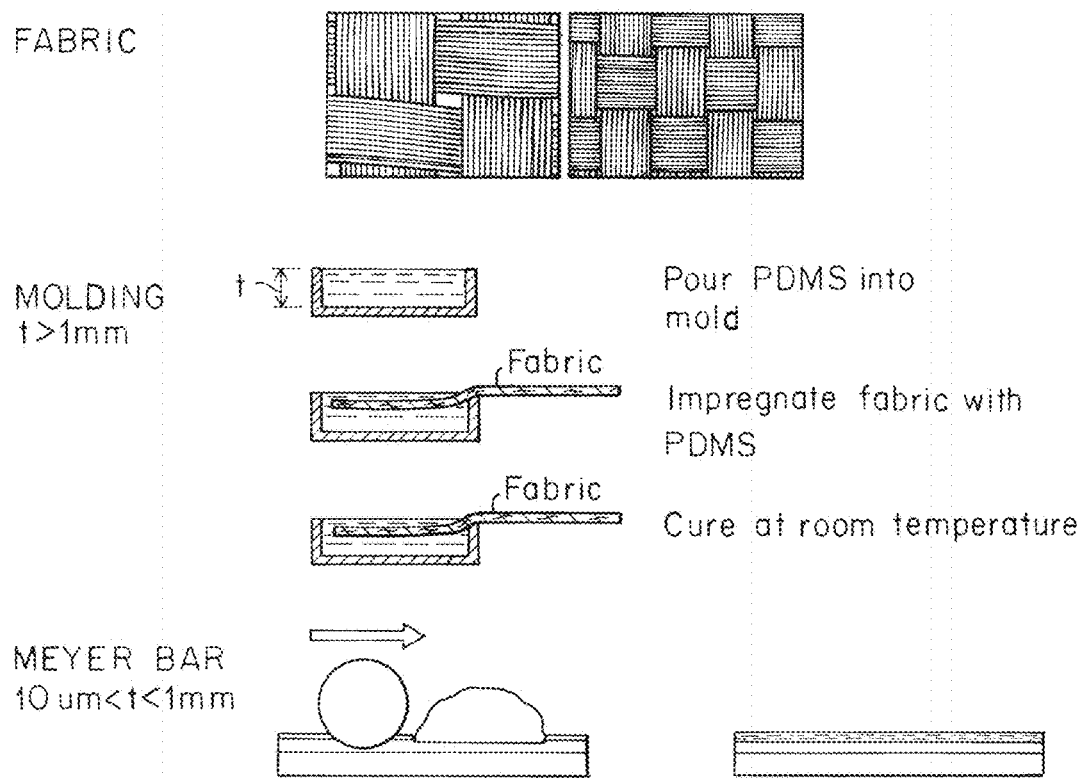
FIG. 3 shows a schematic illustration of an exemplary fabrication process in accordance with some embodiments.

As schematically illustrated in FIG. 3, an efficient and effective fabrication method may be used to fabricate the adhesive pad. The method involves integrating a thin layer of an elastic elastomer on the surface of a fabric.

The tether may be connected to the adhesive pad through any suitable method, such as conventional sewing, stitching, or gluing, which allows easy control of dimensional, orientational, and spatial location of the attachment. The attachment should provide sufficient load sharing and load bearing capacity, which can be controlled through the method of attachment, such as via the stitching pattern, width, and length. Appropriate stitching patterns include straight stitching, zigzag stitching, multi zigzag stitch, satin stitching, honeycomb stitching, ladder stitch, double overlock stitch, and criss-cross stitching. Non-stitch attachment methods, such as hot melt adhesives for fabrics, may also be used.

For example, in an embodiment, a tether-pad connection includes a straight-line stitch that is centered on the one axis of the pad and extends to a length of approximately ⅔ the chord length perpendicular the second pad axis. The tether-pad connection maintains rotational freedom while maintaining high stiffness in the direction of loading. The tether-pad connection may also maintain substantially equal load sharing along the entire length of the connection.

One adhesive pad can act independently or in conjunction with an array of adhesive pads or units (sometimes referred to as a "T-surface"), which may be mounted with rotationally-free joints to a supporting substrate that can be rigid in one or more directions, for example. For certain applications, e.g., a large weight bearing shelf, multiple attachment points for the tether to the adhesive pad may also be employed.

The closure system derives its effectiveness largely due to the ability for a soft elastomeric pad to be integrated into a stiff skin, such as a high strength fiber fabric, so as to achieve large areas of interfacial contact while maintaining high stiffness in the direction of applied loads, e.g., along the fibers of the skin fabric. The interfacial bond may be reversible, for example, provided by Van der Waals forces along the surface of the interfacial bond. Force capacity of the closure is directly related to the axial stiffness of the fabric fibers that comprise the tendon and skin; therefore, high capacity closures are fabricated from high stiffness fibers, such as Kevlar, carbon fibers, or glass. The reusability of the closure system is enhanced by using pad, skin, and tendon materials that behave elastically within the force capacity range of the designed closure, such that viscoelastic, plastic, or fracture deformation losses in the materials are minimized or otherwise reduced. The bending and draping flexibility of the pad, skin, and tendon are directly related to maximizing the probability of establishing intimate, interfacial contact between connecting pads, thus increasing the force capacity and reusability of the closure.

Figure 4:
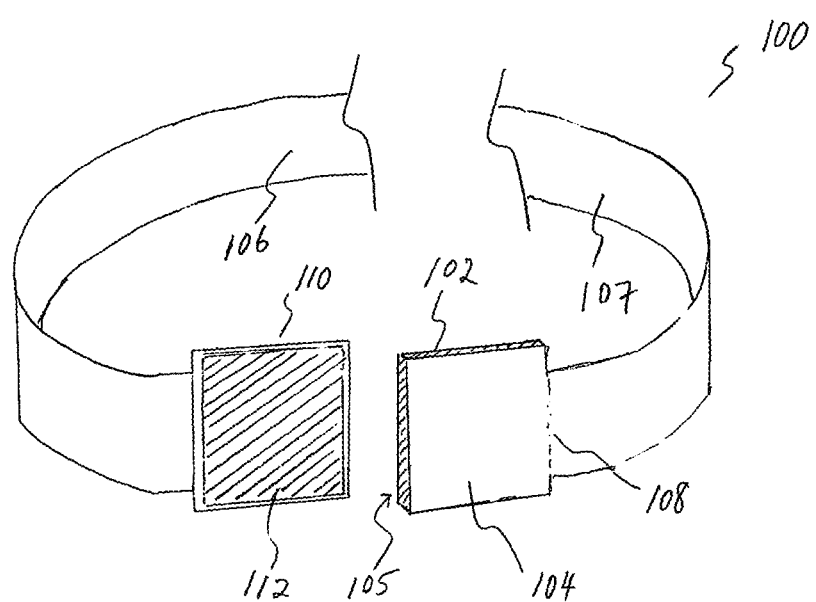
FIG. 4 shows a schematic illustration of an exemplary embodiment.
Figure 5B:
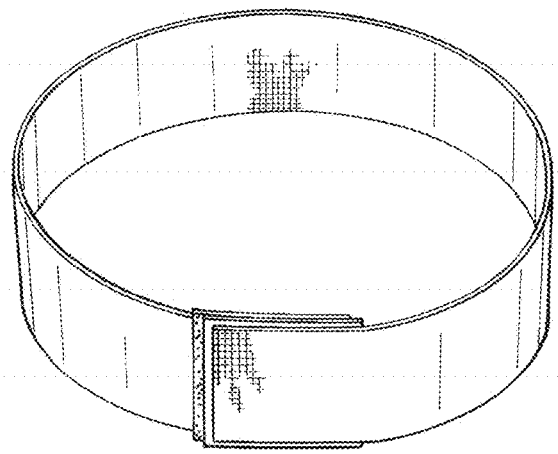
FIGS. 5a-5d show a schematic illustration of an exemplary device according to an embodiment.
Figure 5C:
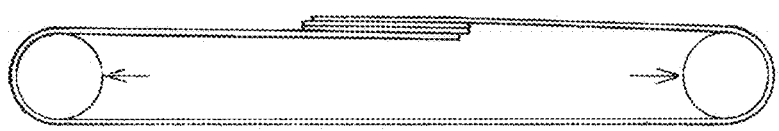
Figure 5A:
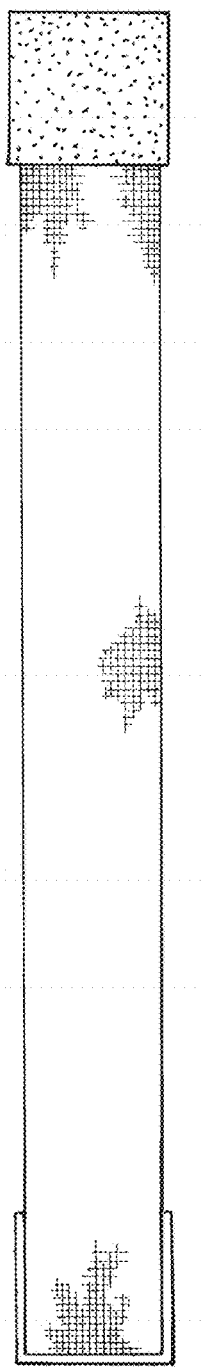
Figure 5D:
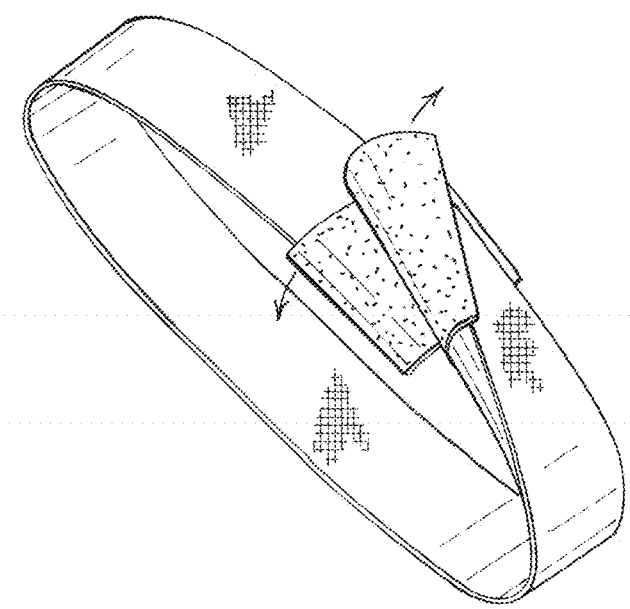

A closure device in accordance with an embodiment is schematically illustrated in FIG. 4. The closure device 100 includes two adhesive pads each with a layer of an elastic material impregnated in a backing layer. The first pad's layer of elastic material 102 is impregnated in a backing layer 104 forming an adhering surface 105. The second pad's layer of elastic material 110 forms an adhering surface 112. While in this embodiment, the elastic material impregnates the backing layer, it can be appreciated that, the elastic material may applied to the backing layer by any suitable manner, for example, by coating thereon, saturated, or another appropriate method.

A tendon (as shown, a belt shaped) member 106, or alternatively, two separate members 106 and 107, is connected, at one end, to the backing layer of the adhesive pad at 108 and, at the other end, to the backing layer of the second pad. To make a closure, the two adhering surfaces 105 and 112 are pressed together. To release the closure, a tugging force may be applied lifting one adhesive pad away from the other.

Figure 6:
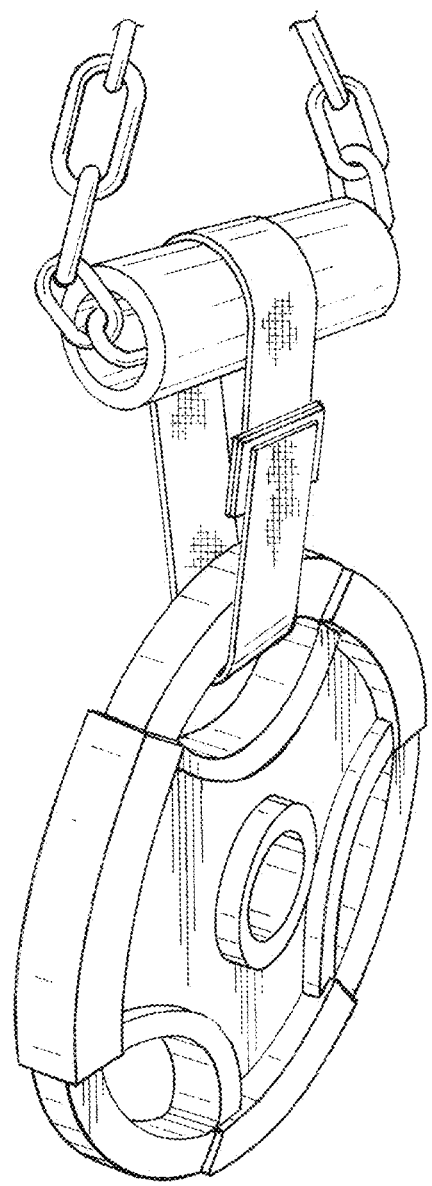
FIG. 6 shows an exemplary device according to an embodiment holding a weight.

FIG. 5 shows an exemplary device in use: (A) device in the open state, (B) placing the adhesive pad on the receiving surface and forming a closure by compression with fingers, (C) being pulled in shear, and (D) being peeled to release the device back to open state. FIG. 6 shows an exemplary depiction of the device in closed form being used in holding a significant weight (25 lb. or 11.34 kg).

Figure 7:
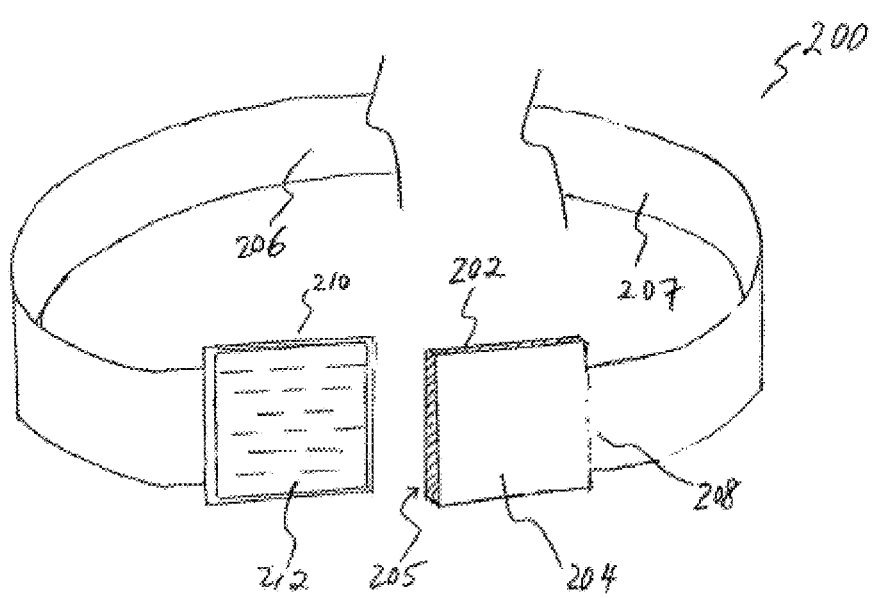
FIG. 7 shows a schematic illustration of an exemplary embodiment.

Another embodiment of a closure device is schematically illustrated in FIG. 7. The closure device 200 includes an adhesive pad with a layer of an elastic material 202 impregnated in a backing layer 204 forming an adhering surface 205. A tendon (as shown, a belt shaped) member 206, or alternatively, two separate members 206 and 207, is connected, at one end, to the backing layer of the adhesive pad at 208. The belt shaped member 206 is attached, at the other end, to a receiving member 210 having a surface 212 for receiving the adhering surface of the adhesive pad.

Figure 8:
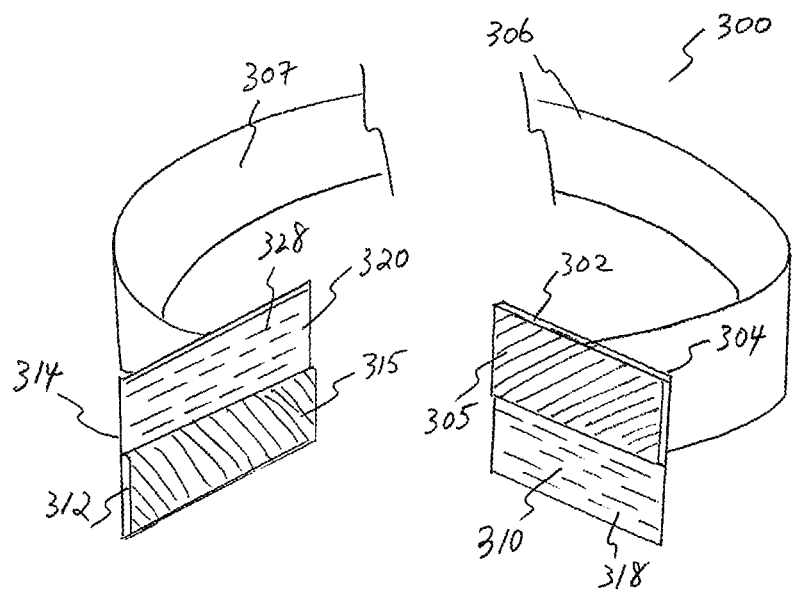
FIG. 8 shows a schematic illustration of an exemplary embodiment.

In yet another example, as schematically illustrated in FIG. 8, the closure device 300 includes two adhesive pads with two backing layers 304 and 314, respective. Each backing layer supports both a layer of an elastic material and a receiving member. Thus, the backing layer 304 supports a first adhesive layer 302 having an adhering surface 305 as well as a first receiving member 310 having a receiving surface 318. Similarly, the backing layer 314 supports a second adhesive layer 312 having an adhering surface 315 as well as a second receiving member 320 having a receiving surface 328. The belt shaped member 306 connects the two adhesive pad/receiving member sets. When in use, the adhering surface 305 is pressed against receiving surface 328, while the adhering surface 315 is pressed against receiving surface 318, thereby forming a suitable connection or closure (e.g., a closed loop). It can be appreciated that the particular patterns shown and described herein are not aspects for various embodiments and other suitable configurations be employed.

Figure 9:
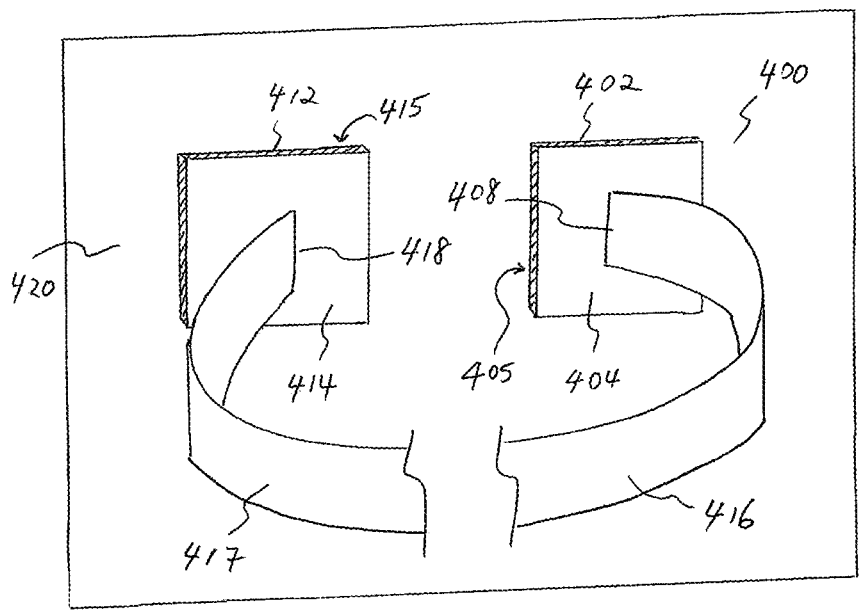
FIG. 9 shows a schematic illustration of an exemplary embodiment.

In another exemplary embodiment, as schematically illustrated in FIG. 9, two independent adhesive devices are included in the device to form a closure with a surface of a third object. Here, the closure device 400 includes a first adhesive pad with a layer of an elastic material 402 impregnated in a first backing layer 404 forming a first adhering surface 405. The device 400 also includes a second adhesive pad with a layer of an elastic material 412 impregnated in a second backing layer 414 forming a second adhering surface 415. The first and second adhesive pads are joined together by a belt shaped member 406, which is attached to the first backing layer at 408 and at the second backing layer at 418. When in use, the first and second adhering surfaces 405 and 415 adhere to a surface of a third object (e.g., wall or window 420) to form a connection or closure (e.g., a looped closure).

Figure 10:
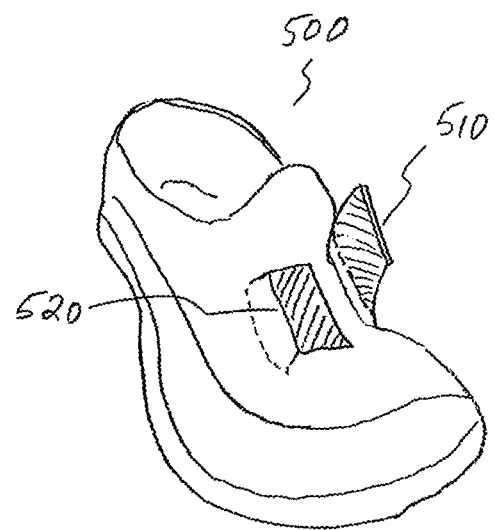
FIG. 10 shows a schematic illustration of an exemplary embodiment used as part of a shoe.

FIG. 10 schematically illustrates another exemplary embodiment of the device 500, which may be used as part of an article of footwear (e.g., shoe, boot, etc.), in place of or in addition to traditional laces or other tightening members. A first adhesive pad 510 and a second adhesive pad 520 are positioned such than when they are suitably pressed against each other so as to mutually adhere, the article of footwear is in a closed state.

Figure 11:
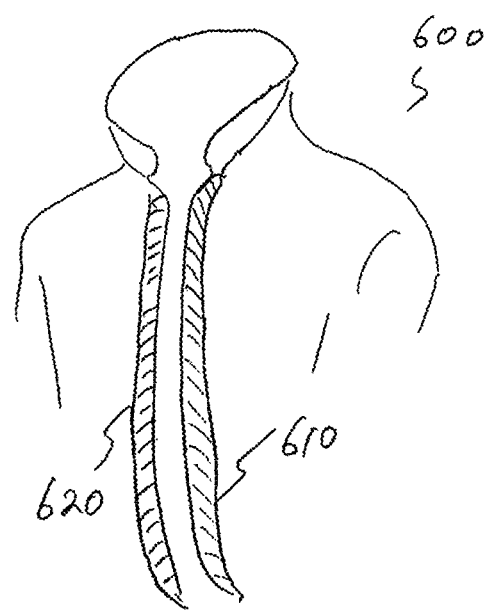
FIG. 11 shows a schematic illustration of an exemplary embodiment used as part of a jacket.

FIG. 11 schematically illustrates another exemplary embodiment of the device 600, which may be used as part of an article of clothing (e.g., coat, suit or other suitable article of clothing) in place of or in addition to buttons or zippers. A first adhesive pad 610 and a second adhesive pad 620 are positioned such than when they are suitably pressed against each other, the article of clothing is in a closed state.

Figure 12A:
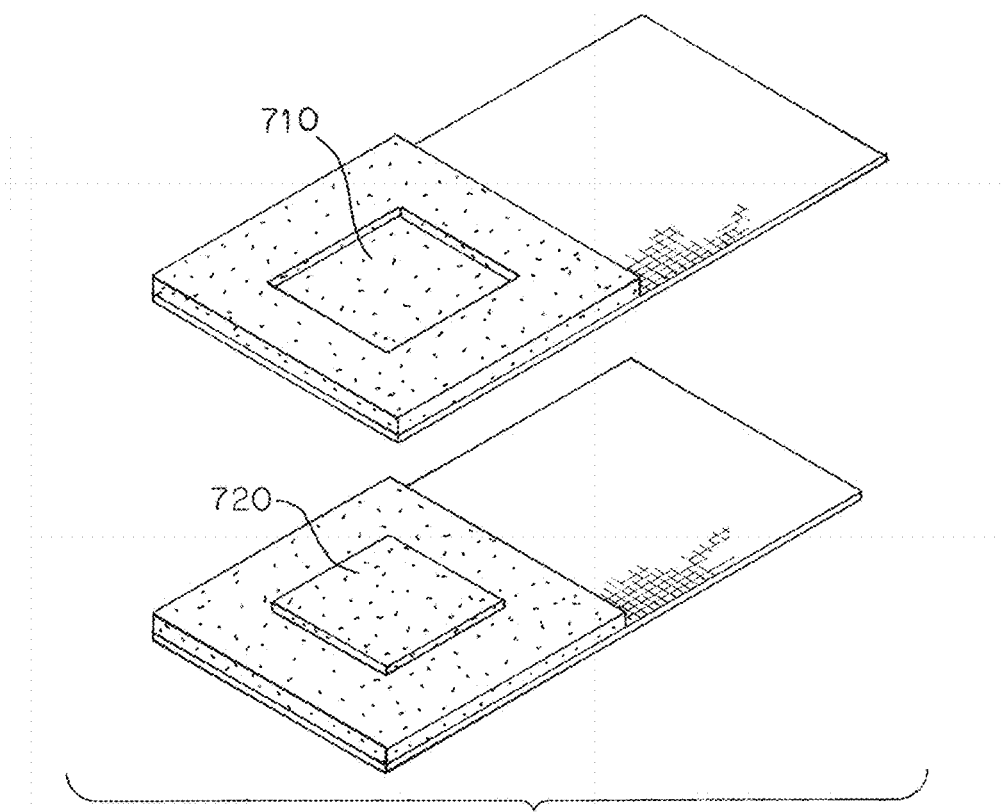
FIG. 12A shows a "male" and "female" embodiment.
Figure 12B:
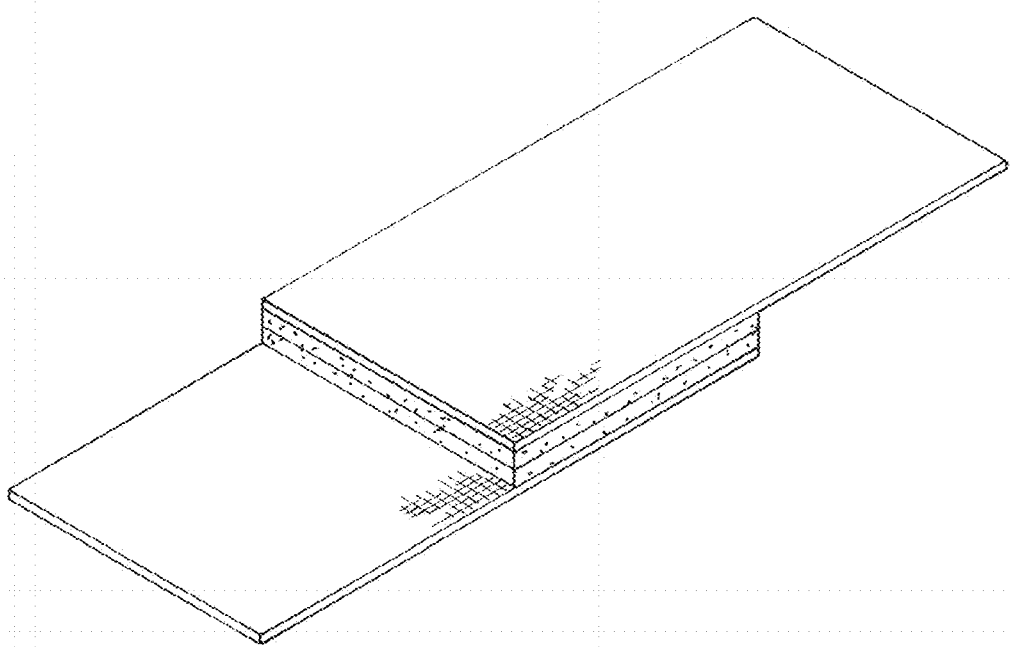
FIG. 12B shows how "male" and "female" embodiments can be joined to form a closure.
Figure 13A:
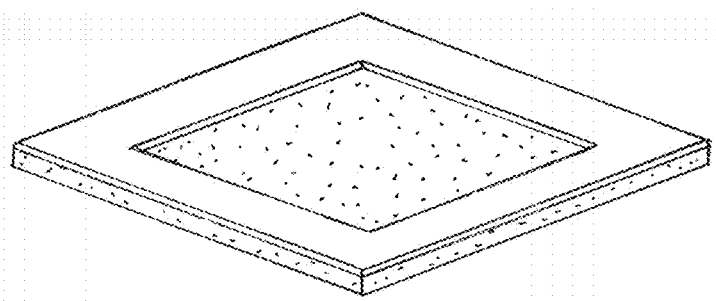
FIGS. 13a-13f illustrate an exemplary embodiment of fabricating an adhesive pad.
Figure 13B:
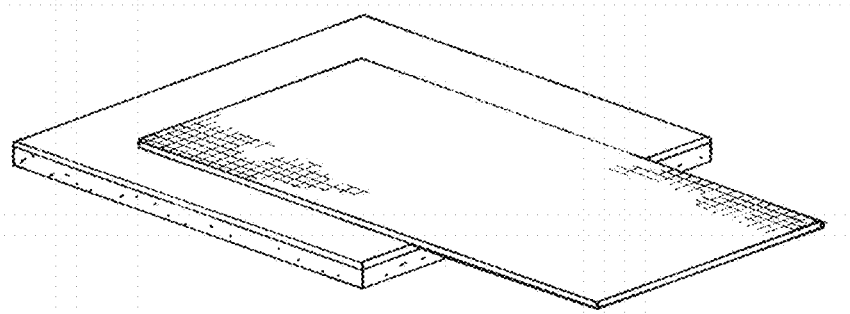
Figure 13C:
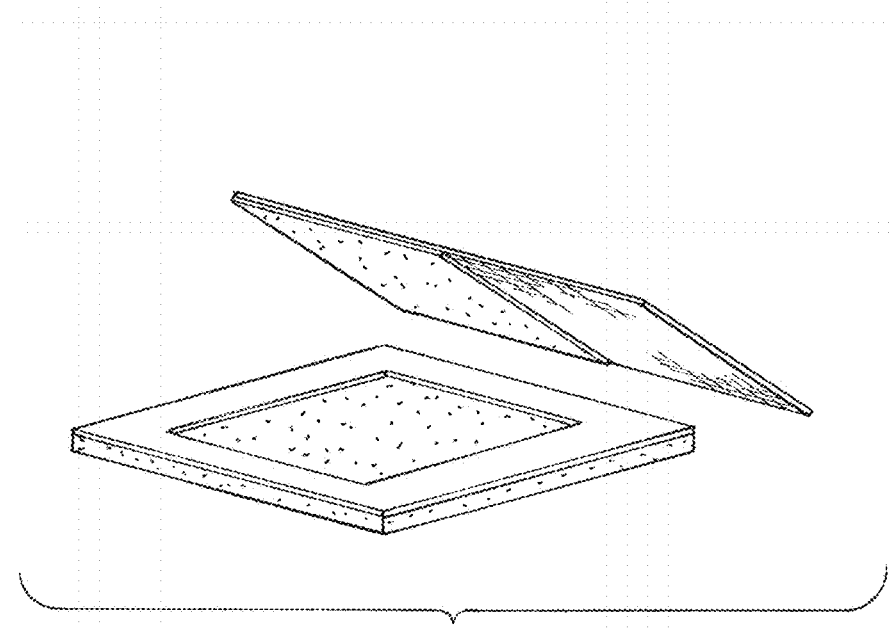
Figure 13D:
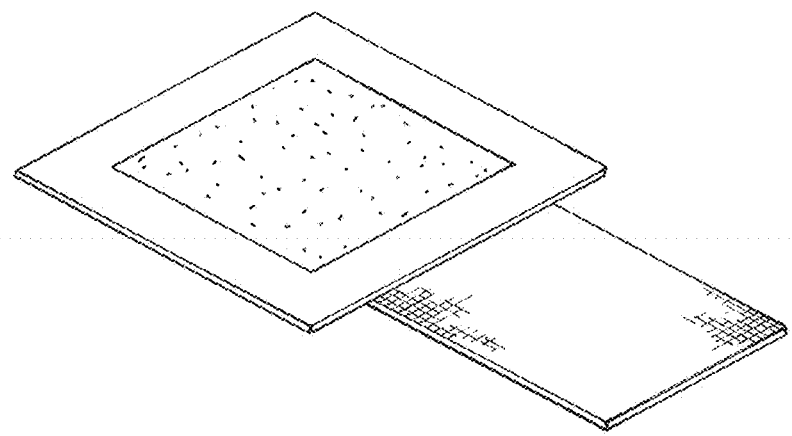
Figure 13E:
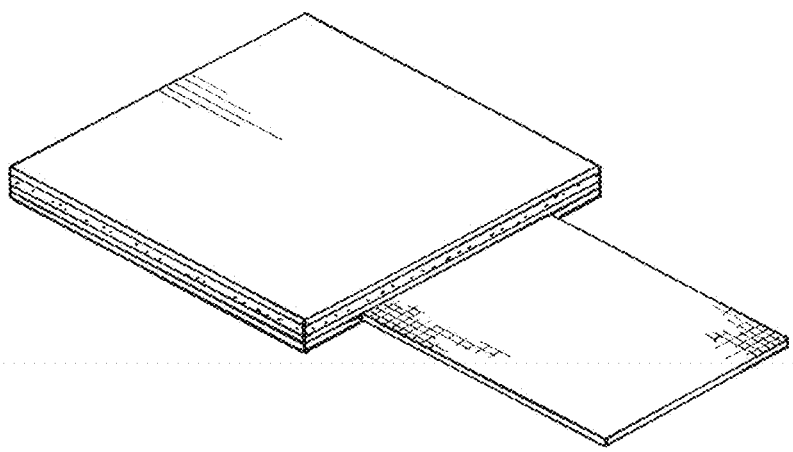
Figure 13F:
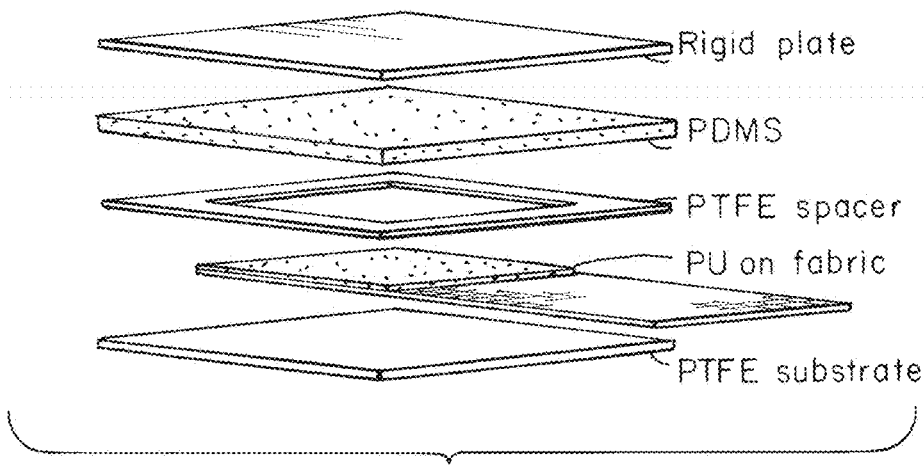
Figure 14A:
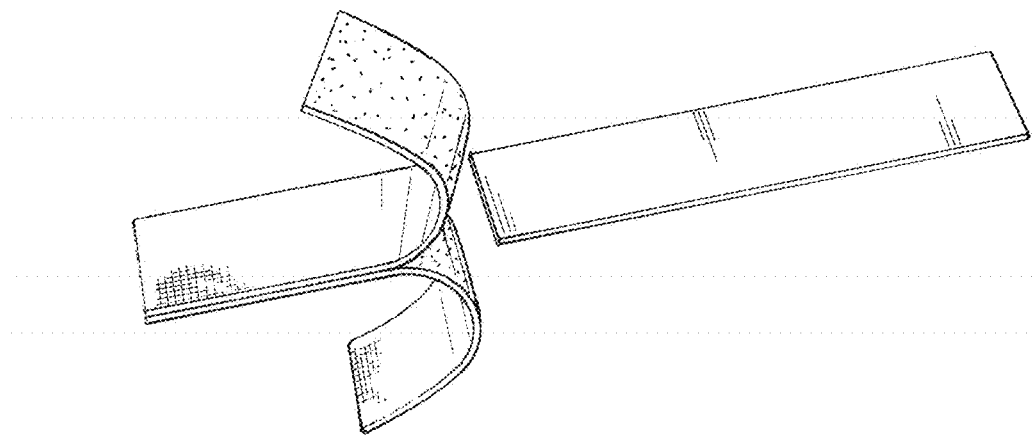
FIGS. 14a-14d depict an exemplary embodiment of a sandwich-type device.
Figure 14B:
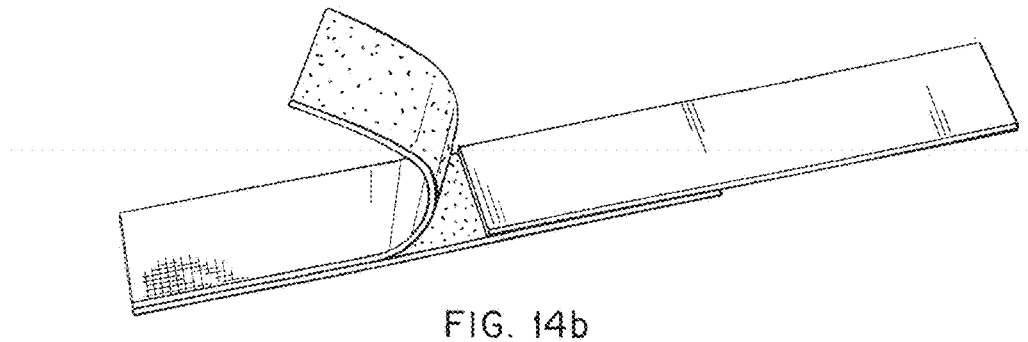
Figure 14C:
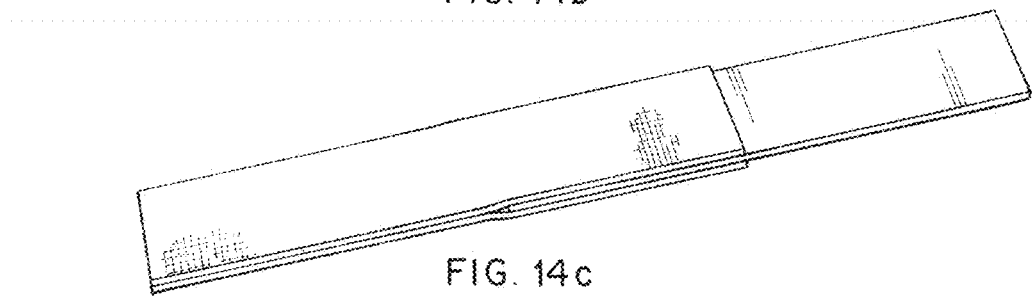
Figure 14D:
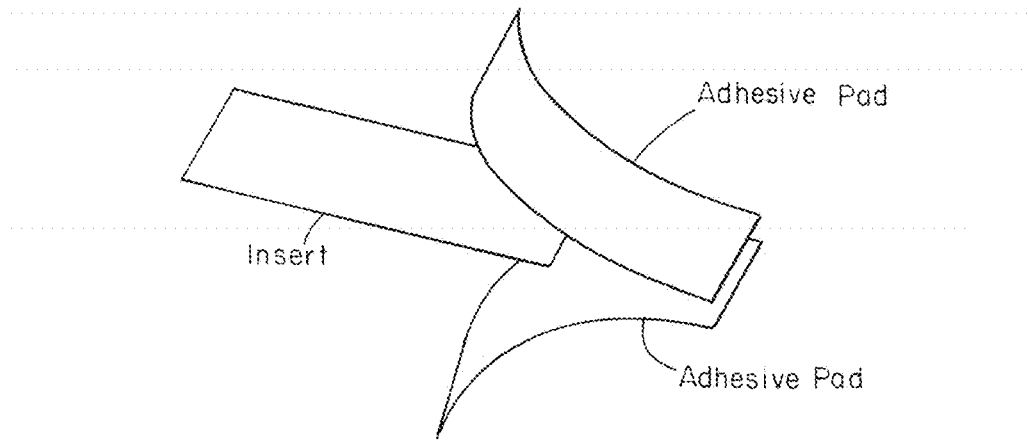

In another exemplary embodiment, as schematically illustrated in FIGS. 12A and 12B, a "lock and key" model in which a region on one pad has a topographically raised region (i.e., male) and the other pad has a topographically depressed region (i.e., female). As depicted in FIG. 12A, the in-plane shape of the "female" (710) and "male" (720) regions are complementary with respect to one another, allowing a tight fit when coupled together (FIG. 12B). The materials used for at least one pad are soft, or suitably compliant, such as an elastomer. The height of the mating regions are less than the thickness of the pad materials surrounding the mating regions.

FIG. 14 shows another embodiment having a sandwich-type configuration. FIG. 14 (*a*)-(*c*) depicts a device with a 3-piece design. In this embodiment, two adhesive pads are included, and an insert can disposed or inserted therebetween. The insert has two adherent faces for receiving the adhering surfaces of the two adhesive pads. FIG. 14(*d*) schematically illustrates this embodiment in a closed configuration. The insert is adhered to the pads on opposite sides, providing for a stronger bond than would otherwise be the case if the insert is adhered to an adhesive pad on only a single side.

The embodiment can be expanded to include one or more additional inserts and/or adhesive pads. For example, the embodiment may include a second insert and a third adhesive pad, taking the configuration of: adhesive pad:insert:adhesive pad:insert:adhesive pad, wherein each insert is sandwiched by two adhesive pads and the adhesive pad sandwiched by two inserts has two adhering surfaces. In this case, the adhesive pad disposed in-between the two inserts presents two adhering surfaces opposite the two inserts. Embodiments in accordance with the present disclosure may include further inserts and adhesive pads, as desired. The embodiment may be utilized in a variety of applications, for example, with two adhesive pads linked or otherwise coupled to an object and the insert coupled to another object such that when pressed together, a releasable connection or closure is formed.

In certain embodiments, a looped connection or closure may be formed. Or, in other embodiments, a non-looped connection or closure may be formed, for example, when two separate adhesive pads are used as shown in FIGS. 10 and 11.

In some embodiments, a closure device, in use, may form a continuous loop. In some embodiments, a closure device, in use, does not form a continuous loop.

Thus, in one aspect, the present disclosure generally relates to a releasable, surface-adhesive closure device. The device may include two adhesive pads, each pad comprising a planar backing layer having high in-plane stiffness; and a planar adhesive layer of an elastic material having an adhering surface on at least one side, wherein the elastic material may be applied (e.g., impregnated, coated, etc.) to the backing layer on at least the side opposing the adhering surface. The two adhesive pads form a releasable seal when suitably pressed against each other with the two adhering surfaces positioned face to face.

In another aspect, the present disclosure generally relates to a releasable, surface-adhesive closure device. The device may include: an adhesive pad and an adherent member. The adhesive pad may include a backing layer having high in-plane stiffness; and a planar adhesive layer of an elastic material having an adhering surface on at least one side, wherein the elastic material is applied to the backing layer on at least the side opposing the adhering surface. The adherent member having a surface for adherence by the adhesive pad. The adhesive pad and the adherent member form a releasable seal when pressed against each other with the adhering surface and the adherent surface positioned face to face.

The term "releasable", as used herein, refers to the capability of an object becoming free from attachment, mooring, adhesion, bonding, or other restraint from another object with no or minimal impairment, ruin, destruction or other damage to either object.

The term "impregnated", as used herein, refers to an object being filled, coated, covered, imbued, soaked, permeated, infiltrated, saturated, or otherwise contacted with a material. An object may be partially "impregnated", for example, partially filled, coated, covered, imbued, soaked, permeated, or infiltrated with a material.

The term "in-plane stiffness" refers to the resistance to deformation under a specified load applied in the plane of a material (e.g., a fabric material). The units of stiffness are force per distance. A material (e.g., a fabric material) is said to have "high" in-plane stiffness when the bending stiffness of the composite material (e.g., elastomer and fabric) is less than the in-plane stretching stiffness.

In certain preferred embodiments, the planar backing layer of the adhesive pad, the tether component, and the adherent member together consecutively form a single continuous planar component.

In certain preferred embodiments, the adhering surface of the adhesive pad and the adherent surface of the adherent member are on the different side of the single continuous planar component.

The adherent surface may be any suitable surface, for example, a surface of metal, wood, glass, carbon, polymers, gels, leather, plastic or ceramic.

In yet another aspect, the present disclosure generally relates to a releasable, surface-adhesive closure device. The device may include: two adhesive pads and a tether component. Each of the two adhesive pads may include a backing layer having high in-plane stiffness and a adhesive layer of an elastic material having an adhering surface on at least one side. The elastic material is applied to the backing layer on at least the side opposing the adhering surface. The tether component attached to the two adhesive pads such that the two adhering surfaces face are disposed on the same side and together form a releasable connection or closure once the two adhesive pads adhesively attach to a third-object adherent surface.

In yet another aspect, the present disclosure generally relates to a releasable, surface-adhesive closure device. The device may include: a first adhesive-adherent set comprising an adhesive pad and a first adherent surface; a second adhesive-adherent set comprising a second adhesive pad and a second adherent surface; and a tether component attached to the two adhesive-adherent set such that, when looped around, the first adhesive pad is adapted to adhesively attach to the second adherent surface and the second adhesive pad is adapted to adhesively attach to the first adherent surface, thereby forming a releasable connection or closure. Each adhesive pad includes a planar backing layer having high in-plane stiffness and a planar adhesive layer of an elastic material having an adhering surface on at least one side. The elastic material may be impregnated onto or otherwise applied to the backing layer on at least the side opposing the adhering surface.

In yet another aspect, various embodiments generally relate to a releasable, surface-adhesive closure device. The device includes: a first adhesive pad, a second adhesive pad, and an insert component. The first adhesive pad includes: a first backing layer having high in-plane stiffness, and a first adhesive layer of an elastic material having an adhering surface on at least one side of the elastic material, wherein the elastic material is applied onto the first backing layer on at least the side opposing the adhering surface. The second adhesive pad includes: a second backing layer having high in-plane stiffness, and a second adhesive layer of an elastic material having an adhering surface on at least one side of the elastic material, wherein the elastic material is applied onto the backing layer on at least the side opposing the adhering surface. The insert component includes a first surface and a second surface. The insert component is disposed between the first adhesive pad and the second adhesive pad such that the first surface of the insert component and the first adhesive layer of the first adhesive pad, when pressed together, form a first releasable seal, and the second surface of the insert component and the second adhesive layer of the second adhesive pad, when pressed together, form a second releasable seal.

In certain embodiments, the second adhesive pad has an adhering surface on two sides of the adhesive layer, and the device further includes: a second insert component comprising a first surface and a second surface; and a third adhesive pad. The third adhesive pad may include: a third backing layer having high in-plane stiffness, and a third adhesive layer of an elastic material having an adhering surface on at least one side, wherein the elastic material is applied to the backing layer on at least the side opposing the adhering surface. The second insert component is disposed between the second adhesive pad and the third adhesive pad such that the first surface of the second insert and the second adhesive layer of the second adhesive pad, when pressed together, form a third releasable seal, and the second surface of the second insert and the third adhesive layer of the third adhesive pad, when pressed together, form a fourth releasable seal.

Embodiments of the closure device may have any appropriate dimension, size or shape.

The adhering surfaces may have any sizes suitable for the application at hand, for example, having an area from about 0.01 $cm^2$ to about 10,000 $cm^2$ or larger (e.g., about 0.01 $cm^2$, 0.05 $cm^2$, 0.1 $cm^2$, 0.5 $cm^2$, 1 $cm^2$, 2 $cm^2$, 5 $cm^2$, 10 $cm^2$, 20 $cm^2$, 50 $cm^2$, 100 $cm^2$, 200 $cm^2$, 500 $cm^2$, 1,000 $cm^2$, 3,000 $cm^2$, 5,000 $cm^2$, 10,000 $cm^2$ or greater, from about 0.01 $cm^2$ to about 5,000 $cm^2$, from about 0.01 $cm^2$ to about 3,000 $cm^2$, from about 0.01 $cm^2$ to about 1,000 $cm^2$, from about 0.01 $cm^2$ to about 500 $cm^2$, from about 0.01 $cm^2$ to about 200 $cm^2$, from about 0.01 $cm^2$ to about 100 $cm^2$, from about 0.01 $cm^2$ to about 50 $cm^2$, from about 0.01 $cm^2$ to about 20 $cm^2$, from about 0.01 $cm^2$ to about 10 $cm^2$, from about 0.01 $cm^2$ to about 5 $cm^2$, from about 0.01 $cm^2$ to about 2 $cm^2$, from about 0.01 $cm^2$ to about 1 $cm^2$, from about 0.02 $cm^2$ to about 10,000 $cm^2$, from about 0.1 $cm^2$ to about 10,000 $cm^2$, from about 0.5 $cm^2$ to about 10,000 $cm^2$, from about 1 $cm^2$ to about 10,000 $cm^2$, from about 5 $cm^2$ to about 10,000 $cm^2$, from about 10 $cm^2$ to about 10,000 $cm^2$, from about 50 $cm^2$ to about 10,000 $cm^2$, from about 100 $cm^2$ to about 10,000 $cm^2$, from about 200 $cm^2$ to about 10,000 $cm^2$, from about 500 $cm^2$ to about 10,000 $cm^2$, from about 1,000 $cm^2$ to about 10,000 $cm^2$).

Each adhesive layer may have any thickness suitable for the application at hand, for example, having a substantially uniform thickness from about 0.0001 mm to about 10 cm (e.g., 0.0001 mm, 0.0005 mm, 0.0001 cm, 0.0005 cm, 0.001 cm, 0.005 cm, 0.01 cm, 0.05 cm, 0.1 cm, 0.2, 0.5 cm, 1 cm, 2 cm, 5 cm, 10 cm, from about 0.0001 mm to about 10 cm, from about 0.0001 mm to about 5 cm, from about 0.0001 mm to about 3 cm, from about 0.0001 mm to about 2 cm, from about 0.0001 mm to about 1 cm, from about 0.0001 mm to about 0.5 cm, from about 0.0001 mm to about 0.3 cm, from about 0.0001 mm to about 0.2 cm, from about 0.0001 mm to about 0.1 cm, from about 0.0005 mm to about 10 cm, from about 0.001 mm to about 10 cm, from about 0.01 mm to about 10 cm, from about 0.05 mm to about 10 cm, from about 0.1 mm to about 10 cm, from about 0.5 mm to about 10 cm, from about 1 mm to about 10 cm, from about 5 mm to about 10 cm, from about 1 cm to about 10 cm, from about 2 cm to about 10 cm).

In certain embodiments, a planar layer of the elastic material has a smooth adhering surface area of greater than about 0.01 $cm^2$ and has a substantially uniform thickness of less than about 0.001 cm. In certain embodiments, the planar layer of the elastic material has a smooth adhering surface area of greater than about 0.05 $cm^2$ and has a substantially uniform thickness of less than about 0.005 cm. In certain embodiments, the planar layer of the elastic material has a smooth adhering surface area of greater than about 0.1 $cm^2$ and has a substantially uniform thickness of less than about 0.01 cm. In certain embodiments, the planar layer of the elastic material has a smooth adhering surface area of greater than about 0.2 $cm^2$ and has a substantially uniform thickness of less than about 0.5 cm. In certain embodiments, the planar layer of the elastic material has a smooth adhering surface area of greater than about 0.5 $cm^2$ and has a substantially uniform thickness of less than about 0.2 cm. In certain embodiments, the planar layer of the elastic material has a smooth adhering surface area of greater than about 1.0 $cm^2$ and has a substantially uniform thickness of less than about 0.1 cm. In certain embodiments, the planar layer of the elastic material has a smooth adhering surface area of greater than about 5.0 $cm^2$ and has a substantially uniform thickness of less than about 0.05 cm. In certain embodiments, the planar layer of the elastic material has a smooth adhering surface area of greater than about 10 $cm^2$ and has a substantially uniform thickness of less than about 0.02 cm. In certain embodiments, the planar layer of the elastic material has a smooth adhering surface area of greater than about 100 $cm^2$ and has a substantially uniform thickness of less than about 0.01 cm. In certain embodiments, the planar layer of the elastic material has a smooth adhering surface area from about 10 $cm^2$ to about 100 $cm^2$ and has a substantially uniform thickness from about 0.01 cm to about 0.05 cm. In certain embodiments, the planar layer of the elastic material has a smooth adhering surface area from about 1,000 $cm^2$ to about 100 $cm^2$ and has a substantially uniform thickness from about 0.5 cm to about 0.05 cm.

In certain embodiments, the elastic material has an elastic modulus from about 0.001 MPa to about 100,000 MPa (e.g., 0.001 MPa, 0.01 MPa, 0.05 MPa, 0.1 MPa, 0.5 MPa, 1.0 MPa, 5.0 MPa, 10 MPa, 15 MPa, 20 MPa, 30 MPa, 40 MPa, 50 MPa, 100 MPa, 200 MPa, 500 MPa, 1,000 MPa, 5,000 MPa, 10,000 MPa, 50,000 MPa, 100,000 MPa, from about 0.001 MPa to about 50,000 MPa, from about 0.001 MPa to about 10,000 MPa, from about 0.001 MPa to about 5,000 MPa, from about 0.001 MPa to about 2,000 MPa, from about 0.001 MPa to about 1,000 MPa, from about 0.001 MPa to about 500 MPa, from about 0.001 MPa to about 100 MPa, from about 0.001 MPa to about 50 MPa, from about 0.01 MPa to about 100,000 MPa, from about 0.1 MPa to about 100,000 MPa, from about 0.5 MPa to about 100,000 MPa, from about 1 MPa to about 100,000 MPa, from about 5 MPa to about 100,000 MPa, from about 10 MPa to about 100,000 MPa, from about 50 MPa to about 100,000 MPa, from about 100 MPa to about 100,000 MPa, from about 1,000 MPa to about 100,000 MPa).

In certain preferred embodiments, the elastic material has an elastic modulus from about 0.05 MPa to about 500 MPa. In certain embodiments, the elastic material has an elastic modulus from about 0.05 MPa to about 300 MPa. In certain embodiments, the elastic material has an elastic modulus from about 0.05 MPa to about 100 MPa. In certain embodiments, the elastic material has an elastic modulus from about 0.05 MPa to about 50 MPa. In certain embodiments, the elastic material has an elastic modulus from about 1 MPa to about 500 MPa. In certain embodiments, the elastic material has an elastic modulus from about 1 MPa to about 300 MPa. In certain embodiments, the elastic material has an elastic modulus from about 1 MPa to about 100 MPa.

The term "backing layer", as used herein, refers to a layer of a material such as fabrics, films, foils, sheets, laminates, panels or panes, wherein the layer is used for support or backing. The backing layer may be made of any suitable material including natural or synthetic, metallic or non-metallic, polymeric or non-polymeric materials and may be formed from a single component or a hybrid/blend of two or more components.

In certain embodiments, the backing layer is made of a fabric material. In certain embodiments, the tether is a fabric material.

The terms "fabric" or "fabrics", as used herein, refer to a material made through weaving, knitting, braiding, intertwining, interlacing, spreading, bonding, connecting or otherwise linking. A fabric may use naturally occurring or synthetic materials or a blend or hybrid thereof wherein both natural and synthetic materials are present. A fabric may be made from a single, two or multiple components and can be made by one or more of weaving, knitting, braiding, intertwining, interlacing, spreading, bonding, connecting or linking. Exemplary synthetic materials useful for fabrics include polyester, polyolefin, spandex, nylon, carbon fiber, polyaramid, carbon fiber polyaramid hybrid, carbon fiber basalt hybrid, fiberglass, carbon fiber, metal fiber, or fiberglass hybrid. Exemplary natural fabrics include cotton, hemp, wool, silk, bamboo string, cellulose, jute, and pina. In certain embodiments, the tether is a non-fabric material, for example, selected from leather, metal sheets, plastic sheets, or non-woven textiles. In some embodiments, the material is made from chain-link meshes.

In certain preferred embodiments, the material of the fabric backing layer may include any suitable material, such as nylon, carbon fiber, cotton, polyaramid, carbon fiber, polyaramid hybrid, another appropriate material, or combinations thereof.

The unique approach to a closure system as disclosed herein represents a unique combination of adhesion attributes of polymer materials and integrated mechanical designs through proper conservation of rotational freedom, low flexural modulus normal to the adhesive interface, and high stiffness in load bearing directions. A scaling relationship has been developed by the inventors to provide a framework for understanding the adhesive performance of the materials devices over a range of size scales and geometries (FIG. 2). This scaling relationship suggests that the adhesive capacity ($F_C$) of an interface is governed by three simple parameters, which are dependent on both the geometry and material properties of the interface. To design reversible adhesives which can adhere to various substrates, the interfacial interactions ($G_C$) should rely upon non-specific van der Waals forces, rendering $G_C$ an ineffective control parameter. Therefore, to scale $F_C$ for adhesive materials the material system must not just rely on area on contact (A) or the system compliance (C) but must develop attributes that increase the A/C ratio. This presents a challenge; materials must be soft to increase true contact but stiff to achieve high loads. Soft materials are able to create large-scale contact but have a high compliance when loaded, while stiff materials are unable to create extensive contact; both cases result in a null effect on the A/C ratio. Embodiments described herein provide for a mechanism for maximizing A/C, and tuning this governing parameter for different applications. As schematically illustrated in FIG. 3, an efficient and effective fabrication method may be used to fabricate the T-pad. The method involves integrating a thin layer of an elastic elastomer into a surface of a fabric.

The tether can be connected to the pad through any suitable methods, such as conventional sewing, stitching, or gluing, which allows easy control of dimensional, orientational, and spatial location of the attachment. The attachment should provide sufficient load sharing and load bearing capacity, which, in some cases, can be controlled through the stitching pattern, width, and length. Appropriate stitching patterns include straight stitching, zigzag stitching, multi zigzag stitch, satin stitching, honeycomb stitching, ladder stitch, double overlock stitch, and criss-cross stitching.

For example, a particularly advantageous tether-pad connection is a straight-line stitch that is centered on the one axis of the pad and extends to a length of approximately ⅔ the chord length perpendicular the second pad axis. The tether-pad connection should maintain rotational freedom while maintaining high stiffness in the direction of loading. The tether-pad connection should preferably maintain equal load sharing along the entire length of the connection.

An adhering surfaces may be microscopically smooth or patterned, for example. A backing layer may be a fabric backing layer. A planar layer of an elastic material may comprise the same elastic material or different elastic materials.

In certain preferred embodiments, the elastic material is a block copolymer elastomer. In certain preferred embodiments, the elastic material comprises one or more of siloxane-based elastomers, urethane-based elastomers, and acrylate-based elastomers.

In some embodiments, each layer of an elastic material comprises two or more separate smaller elastic material layer units.

It is noted that the term "backing", as used herein, includes but is not limited to the situation where the referred to layer or material is the back (or the last) layer of the device structure. As described herein, a backing layer may be an interior layer or component of a structural arrangement.

Elastic materials that may be used in the adhesive pads include any suitable elastomers, naturally occurring or synthetic. For example, suitable elastomers include siloxane-based elastomers, urethane-based elastomers, acrylate-based elastomers, ethylene-propylene, polybutadiene, polyisoprene, polychloroprene, ethylene-acrylate, bromoisobutylene-isoprene, chloroisobutylene-isoprene, acrylonitrile-butadiene, styrene-butadiene, styrene-butadiene-styrene, styrene-isoprene-styrene, or styrene-ethylene-butylene-styrene rubbers.

An exemplary siloxane-based elastomer is polydimethylsiloxane (PDMS), which belongs to a group of polymeric organosilicon compounds that are commonly referred to as silicones. PDMS, widely used silicon-based organic polymer, has preferred rheological (or flow) properties. PDMS is generally inert, non-toxic and non-flammable.

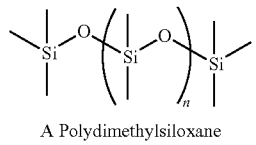

A Polydimethylsiloxane

Other elastic materials that may be used in the adhesive pads include polyurethanes, which are polymers of organic units covalently joined by urethane (carbamate) links.

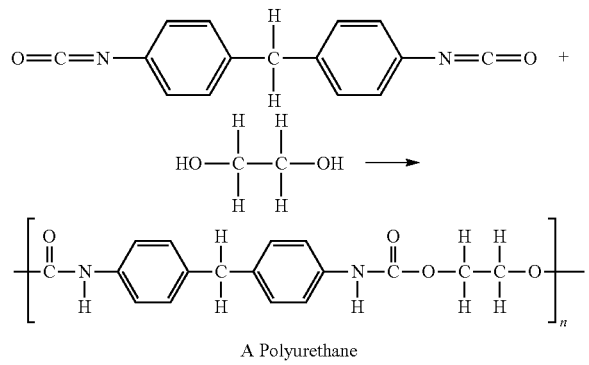

A Polyurethane

A urethane linkage is produced by reacting an isocyanate group, —N=C=O with a hydroxyl group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, R—(N=C=O)$_n$≥2 and a polyol is a molecule with two or more hydroxyl functional groups, R'—(OH)$_n$≥2. The reaction product is a polymer containing the urethane linkage, —RNHCOOR'—. Examples of polyurethane monomers ("pre-polymers") includes hydroxyl ended molecules, such as polyethylene glycol, polypropylene glycol, poly tetramethylene glycol, or bisphenol A (hydroxyl-containing monomers) and an aliphatic or aromatic based isocyanate, such as methylene diphenyl diisocyanate, toluene diphenyl diisocyanate, hexamethylene diisocyanate, isophorone diisocyanate, or a polyisocyanate resulting from the combination of multiple of these monomers (for example, three molecules of methylene diphenyl diisocyanate form a trimer which contains three isocyanate functional groups).

In some embodiments of the releasable, surface-adhesive closure device, a region on one adhesive pad has a topographically raised or male region and a region on the other adhesive pad has a topographically depressed or female region such that a lock and key type coupling occurs once the two adhesive pads are pressed against one another.

The devices may be designed to be suitable for single, two, multiple, extended and repeated use (e.g., 100 or more repeated closures and releases over an extended period of months or longer).

In certain embodiments, the ratio of storage to loss elastic moduli is at least greater than about 10 (e.g., greater than 15, 20, or 50) at the operating temperature of interest.

The layer of the elastic material may have any size and shape as a particular application requires, for example, it may have a substantially circular outer boundary, a substantially rectangular outer boundary, a substantially elliptical outer boundary, or a substantially irregular outer boundary. The size of the closure devise may be any suitable size dependent on the application, for example, ranging from about 1 mm$^2$ to about 500 cm$^2$.

The adhesive closure systems and devices, as well as related methods, disclosed herein can be designed, for example, to fit a number of applications ranging from fasteners, reinforcements, taping or wrapping, apparel, housewares, shoes, gloves, toys, medical devices, among others.

EXAMPLES

Fabrication of PU Adhesive Pads

FIG. 13 schematically illustrates an embodiment of the molding technique by which to form a pad with polyurethane. On top of a polytetrafluoroethylene substrate fiber was placed for the adhesive backing layer. A polytetrafluoroethylene (PTFE) spacer was placed on top of the fiber that allows for controlling polyurethane (PU) thickness, and uncured PU prepolymer was poured into the mold. A polydimethylsiloxane pad was then placed on top with a glass plate, and finally the system was weighted with a 20.5 kg weight. This setup is allowed to cure for 24 hours. The second adhering surface is then prepared following the same procedure on the other end of the fiber such that the two adhering surfaces are disposed on different sides. Next, the entire device is placed into a 70° C. oven for 24 hours to finish the curing process. The adhesive pad is then mechanically cut to size.

Utilizing this molding technique, a smooth adhering surface (utilizing a smooth PDMS top layer), or surface features (utilizing a patterned PDMS top layer) can be achieved. The thickness of the adhesive can be changed by modifying the thickness of the PTFE spacer. This method may also be altered to work using a doctor blade system, which would allow for mass production of adhesive pads.

Elastic modulus referred to herein is the storage modulus values and can be determined, for example, by dynamic mechanical analysis (e.g., where the elastic material is a 40 mm×5 mm×1 mm strip, and tested in extension at a strain of 0.1%, at a frequency of 1 Hz, and at a temperature of 20° C.). This procedure is not meant to be the only procedure for determining elastic modulus.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of embodiments disclosed herein, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor the embodiments disclosed herein as the preferred disclosure.

EQUIVALENTS

The representative examples are intended to help illustrate the aspects, and are not intended to, nor should they be construed to, limit the scope. Indeed, various modifications and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of embodiments disclosed herein in its various embodiments and equivalents thereof.

What is claimed is:

1. A closure device capable of forming a releasable seal, comprising
   an adhesive pad comprising:
      a backing layer; and
      an elastic planar layer having a first and a second side, the first side applied to the backing layer, and the second side having an adhering surface, wherein the backing layer has a higher in-plane stiffness than the elastic planar layer; and
   an adherent member having an adhering surface;
   wherein the adhesive pad and the adherent member are releasably attachable to one another when pressed against each other with the adhering surface of the second side of the layer of elastic material and the adhering surface of the adherent member positioned face-to-face.

2. The closure device of claim 1, further comprising a tether component attached to the backing layer on a side opposite the elastic planar layer, wherein the tether is capable of bearing a load force.

3. The closure device of claim 2, wherein the backing layer, the tether component, and the adherent member together consecutively form a single continuous component.

4. The closure device of claim 3, wherein the adhering surface of the adhesive pad of the second side of the elastic planar layer and the adhering surface of the adherent member are on a same side of the single continuous component.

5. The closure device of claim 1, wherein the backing layer comprises a natural fabric material, a synthetic fabric material, or a blend or hybrid thereof.

6. The closure device of claim 5, wherein the natural fabric material is selected from cotton, hemp, wool, silk, bamboo string, cellulose, jute, and pina.

7. The closure device of claim 5, wherein the synthetic fabric material is a fabric of polyester, polyolefin, spandex, nylon, carbon fiber, polyaramid, carbon fiber polyaramid hybrid, carbon fiber basalt hybrid, fiberglass, carbon fiber, or fiberglass hybrid.

8. The closure device of claim 5, wherein the adhering surface of the adherent member comprises a surface of metal, wood, carbon, polymers, gels, leather, plastic or ceramic.

9. The releasable, surface-adhesive closure device of claim 1, wherein the releasable seal is part of a closed loop when the adhesive pad and the adherent member are pressed against each other.

10. The closure device of claim 1, wherein the adhering surface of the adhesive pad has an area in the range of 0.01 $cm^2$-100 $m^2$.

11. The closure device of claim 1, wherein the adhering surface of the adhesive pad has a uniform thickness of 0.0001 mm-10 cm.

12. The closure device of claim 1, wherein the elastic planar layer has an elastic modulus of 0.001 MPa-100,000 MPa.

13. The closure device of claim 1, wherein said closure device is capable of multiple cycles of closure and release.

14. The closure device of claim 1, wherein the adherent member is a second adhesive pad, and wherein the first and second adhesive pads are releasably attachable to one another using the adhering surfaces of the two adhesive pads.

15. The closure device of claim 14, further comprising a tether attached to at least one adhesive pad.

16. The closure device of claim 1, wherein the elastic planar layer includes an elastomeric material.

17. The closure device of claim 1, wherein the adhesive pad and the adherent member form a seal when they are attached to one another.

* * * * *